Oct. 15, 1940.                B. DICK                2,218,191
                    BRAKE ACTUATING MECHANISM
                   Filed Jan. 3, 1939          2 Sheets-Sheet 1
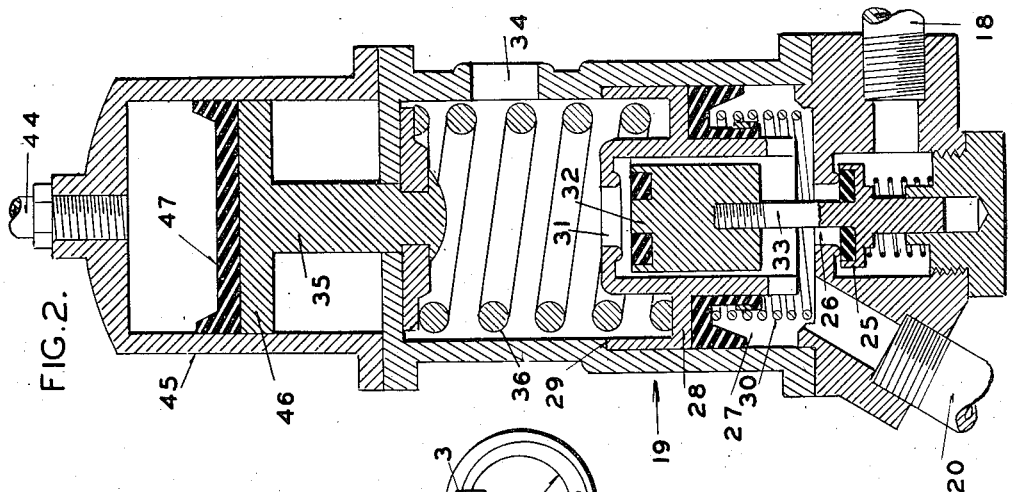
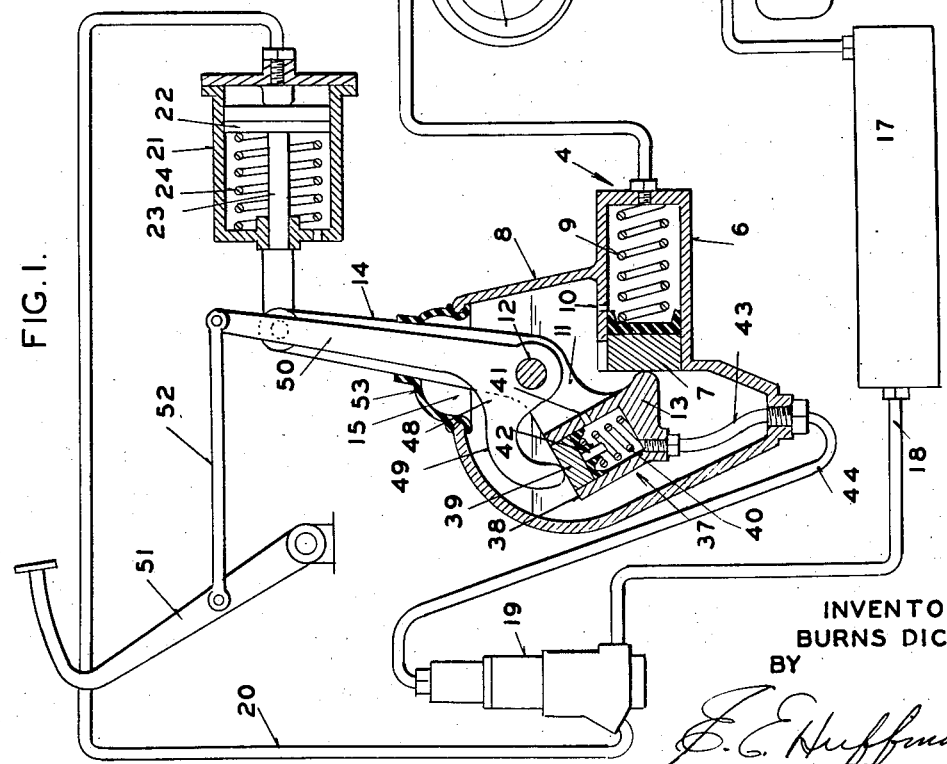
INVENTOR
BURNS DICK
BY
*E. E. Huffman*
ATTORNEY

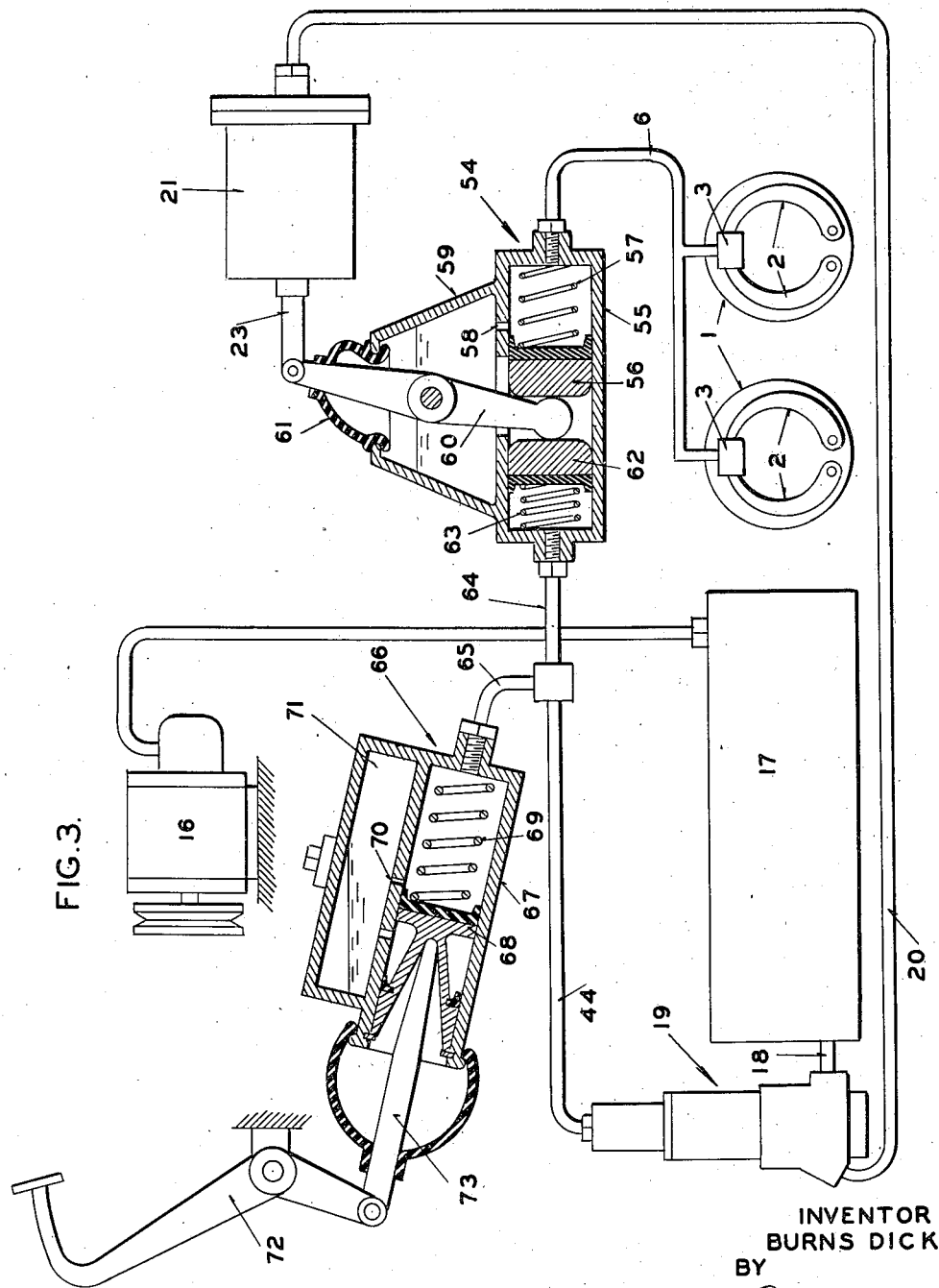

Patented Oct. 15, 1940

2,218,191

UNITED STATES PATENT OFFICE 2,218,191

BRAKE ACTUATING MECHANISM

Burns Dick, Ferguson, Mo., assignor to Wagner Electric Corporation, St. Louis, Mo., a corporation of Delaware Application January 3, 1939, Serial No. 248,979

7 Claims. (Cl. 188—152)

My invention relates to brakes and more particularly to means for actuating the brakes.

One of the objects of my invention is to provide means for manually operating a remotely positioned control valve for a fluid pressure operated brake actuating means and to so combine therewith means whereby the brake can be manually actuated in the event of partial or total failure of the fluid pressure operated brake actuating means.

Another object of my invention is to provide hydraulic means for operating a remotely positioned control valve for power actuating means for brakes and to so combine said hydraulic means with a manual means for actuating the brakes that the manual means will only be operative to actuate the brakes in the event of partial or total failure of the power means.

Other objects of my invention will become apparent from the following description taken in connection with the accompanying drawings in which Figure 1 is a schematic view of a brake actuating mechanism embodying my invention, parts being shown in section; Figure 2 is a cross-sectional view of the control valve; and Figure 3 is a schematic view of another brake actuating mechanism also embodying my invention, parts being shown in section.

Referring to Figures 1 and 2 in detail, each of the brakes 1 have their shoes 2 actuated by a fluid motor 3 in communication with a compressor 4 by means of a conduit 5. The compressor comprises a cylinder 6, a piston 7 reciprocable therein, and a reservoir 8 surrounding the rear portion of the cylinder. The piston is normally biased to a retracted position by a spring 9 and when in this position, it uncovers a compensating port 10 for placing the cylinder ahead of the piston in communication with the reservoir. The piston 7 is actuated by a lever 11 pivoted on a shaft 12 in the reservoir, the lower arm 13 of the lever operatively engaging the piston and the upper arm 14 extending through an enlarged opening 15 in the top of the reservoir.

The lever 11 is shown as actuated by air pressure, the system comprising a compressor 16 for storing air under pressure in a storage tank 17, this tank being connected by a conduit 18, a control valve 19, and a conduit 20 to a power cylinder 21. The piston 22 of the power cylinder is connected by a piston rod 23 to the arm 14 of the compressor actuating lever 11, and a spring 24 biases the piston to inoperative position.

The control valve 19, shown in detail in Figure 2, is of well-known construction and comprises a normally closed inlet valve element 25 for controlling the passage of air from the conduit 18 to the conduit 20 through the opening 26 and chamber 27. Within the chamber 27 is a reaction piston 28 normally biased against a stop 29 by a spring 30. The central portion of the piston is provided with an exhaust opening 31 controlled by a normally open exhaust valve element 32 connected to the inlet valve element 25 by a stem 33. A port 34 above the piston permits passage of exhausted air to atmosphere. The piston 28 is actuated by a stem 35 and a spring 36 which is normally uncompressed when the stem is not being actuated and the piston is against the stop 29.

When it is desired to actuate the compressor 4 by the power cylinder to thereby apply the brakes, the stem 35 of the valve is depressed, thus moving the piston 28 downwardly by spring 36. The initial movement of the piston will close exhaust port 31 and pick up exhaust valve element 32. Additional movement of the piston will now open the inlet valve element 25 and allow air under pressure to pass through conduit 20 to the power cylinder and move the piston thereof to the left to thus actuate piston 7 by means of lever 11. As soon as sufficient pressure is developed in chamber 27 to compress spring 36, the piston 28 will be moved upwardly until the inlet valve element is seated, thus cutting off air from the storage tank. If it is desired to apply additional air pressure to the power cylinder, stem 35 of the valve can be moved an additional distance, thereby reopening valve element 25 and admitting more air under pressure to the power cylinder. When this pressure is sufficient to move piston 28 of the valve upwardly and compress spring 36, the valve element 25 will again be seated. When it is desired to exhaust the power cylinder and release the brakes, the stem 35 is permitted to move upwardly, thus allowing the piston to also be moved upwardly and causing the exhaust valve element to be unseated and air to pass to atmosphere.

In many vehicle brake installations it is not always possible to mount the control valve 19 in such a position that it can be conveniently connected to the brake pedal and yet permit the pedal to be connected to also actuate the brake applying compressor by manual effort in the event the air pressure system should fail. I have, therefore, provided a hydraulic system for operating the control valve, thus permitting said valve to be mounted in any convenient place.

I have also so associated this compressor with the brake pedal and its connection with the compressor 4 for the brakes that movement of the pedal will always operate the valve and cause the brakes to be applied by the power cylinder but in the event of failure of the air pressure system, the pedal can be employed to apply the brakes by manual force.

The lower arm 13 of the lever 11 carries a small compressor 37 comprising a cylinder 38 integral with the lever and piston 39 reciprocable therein. The piston is biased to inoperative position by a spring 40 and when in this position, it uncovers a port 41 for placing the cylinder in communication with the reservoir 8. A projection 42 is carried by the piston and is adapted to abut the end of the cylinder and limit the movement of the piston relative to the cylinder.

The lower end of the cylinder communicates with a flexible conduit 43 connected to a conduit 44 attached to the lower end of the reservoir and leading to a cylinder 45 secured to the top of the control valve 19. Within this cylinder is a piston 46 integral with the stem 35, and a sealing cup 47 for the piston.

A second lever 48 is coaxially pivoted with the lever 11 on the shaft 12 and its lower arm 49 engages piston 39 and its upper arm 50 extends through the opening 15 in the top of the reservoir 8 and along side arm 14. The lever 48 is actuated by a pedal 51 connected to arm 50 by a rod 52. A dust excluding boot 53 surrounds arms 50 and 14 and closes hole 15.

Referring to the operation of the above described mechanism, initial movement of the pedal 51 will result in lever 48 being rotated relatively to the lever 11, thereby causing piston 39 to move relatively to the cylinder 38, first closing off port 41 and then placing the fluid in the cylinder under pressure. This will cause pressure to be applied to piston 46 of the fluid motor operatively associated with the control valve 19 and move the stem 35. When this stem is moved, the inlet valve element 25 is opened and air under pressure is admitted to the power cylinder to move its piston in a manner already described. Operation of the power cylinder will result in a counter-clockwise rotation of lever 11 and movement of piston 7 to the right to actuate brakes 1. If the movement of the pedal is stopped at any point in its travel, the inlet valve 25 of the control becomes closed, thereby preventing further operation of the power cylinder. When the brake pedal is released, the fluid pressure acting on the piston 46 will be relieved, thereby exhausting the power cylinder and permitting piston 7 to return to its inoperative position. In the event one of the conduits 18, 20 or 44 should break or there is insufficient air pressure to operate the power cylinder, the brakes may, nevertheless, be applied by manual force. When the pedal is operated, piston 39 will be moved forwardly until the pressure created thereby is of such value that the cylinder 38 will be moved therewith, thus resulting in force being transmitted directly to piston 7, thereby applying manual force to piston 7 and actuating the fluid motors 3 of the brakes. If sufficient pressure cannot be created in compressor 37 to move lever 11 through the medium of the fluid therein, projection 42 will engage the end of cylinder 38 and act as the force transmitting medium between levers 48 and 11. By having the compressor 37 in reservoir 8, the same reservoir serves both compressors 37 and 4.

Referring to the modification shown in Figure 3, similar parts, such as the brakes, the power cylinder, the compressor, the storage tank and the control valve, are indicated by the same reference characters. The compressor 54 for the hydraulic brake actuating system comprises a cylinder 55 having reciprocable therein a piston 56. The piston is biased to retracted position by a spring 57 and when in this position, it uncovers the compensating port 58 for placing the cylinder ahead of the piston in communication with the reservoir 59. The reservoir has pivotally mounted therein a lever 60 for actuating the piston 56, this lever extending through a hole in the top of the reservoir and for connection with the piston rod 23 of the power cylinder 21. A dust excluding boot 61 closes the hole in the reservoir.

The rear end of the cylinder 55 also has reciprocably mounted therein a piston 62 biased by a spring 63 in abutting relation with the lower end of lever 60 which engages piston 56. The piston 62 and the rear end of the cylinder form a fluid motor and it is connected by conduits 64 and 65 to a compressor 66. The conduit 44 leading from the fluid motor of the control valve 19 is connected to the conduits 64 and 65 at their junction, thus also placing said fluid motor in communication with the compressor.

The compressor 66 is of usual construction comprising a cylinder 67 having a piston 68 reciprocable therein. The piston is biased to its retracted position by a spring 69 where it uncovers a compensating port 70 for placing the reservoir 71 in communication with the portion of the cylinder ahead of the piston. The piston 68 is actuated by a brake pedal 72 and a piston rod 73.

Referring to the operation of the structure shown in Figure 3, movement of pedal 72 will cause pressure to be developed in compressor 66, and this pressure will act upon the piston 46 of the control valve to thereby open the inlet valve element 25 and permit air under pressure to actuate the power cylinder 21 to cause pressure to be applied to piston 56 and the brakes to be operated. The piston 62 will continue to follow up the movement of piston 56 since pressure is at all times acting upon said piston 62 whenever the compressor 66 is operated. In the event the air pressure system should fail to operate the power cylinder, any movement of pedal 72 will, nevertheless, actuate the brakes. Fluid under pressure from compressor 66, in addition to being applied to piston 46 of the control valve, will also be applied to piston 62, which latter piston will apply pressure directly to the piston 56 and consequently apply the brakes. The total pressure created by compressor 66 will not be effective upon piston 62 until piston 46 of the control valve has been moved the full length of its travel and abuts the top of the control valve casing. This will not have any serious effect upon the application of manual force to the brakes since the capacity of the fluid motor for actuating the control valve is small in comparison to the capacity of the fluid motor containing piston 62.

Both constructions above described permit the control valve to be placed at any point desired, thus producing a braking system that is adaptable to be installed on all vehicles regardless of where the available mounting space is situated. The brakes are always actuated by power as long as such power is available but in the event of partial or total failure thereof, manual force can be applied to actuate the brakes.

Being aware of the possibility of other modifications in the particular structures herein described without departing from the principles of my invention, I do not intend that their scope be limited except as set forth by the appended claims.

Having fully described my invention, what I claim as new and desire to secure by Letters Patent of the United States is:

1. In mechanism of the class described, a brake, means for applying the brake, a lever for actuating the applying means, power means for operating the lever and comprising a fluid motor, a source of fluid pressure and a control valve, a pivoted pedal, means for connecting the pedal to the lever by a lost motion connection and comprising a second lever, a compressor carried by the lever, a fluid motor in communication with the compressor and operatively connected to the control valve, and means including the second lever for operating the compressor by the movement of the pedal prior to taking up the lost motion.

2. In mechanism of the class described, a brake, means for applying the brake, a lever for actuating the applying means, power means for operating the lever and comprising a fluid motor, a source of fluid pressure and a control valve, a compressor carried by the lever and comprising a piston and a cylinder having predetermined relative movement, a second lever coaxially pivoted with respect to the first lever and operatively connected to actuate the compressor, a pedal connected to the second lever, and a fluid motor in communication with the compressor and operatively connected to the valve.

3. In mechanism of the class described, a brake, a liquid pressure system including a compressor and motor for applying the brakes, a reservoir for the compressor, a lever pivotally mounted in the reservoir for actuating the compressor, power means for operating the lever and comprising a fluid motor, a source of fluid pressure and a control valve for controlling communication of the fluid under pressure from said source to the power means, a second compressor carried by the portion of the lever in the reservoir and comprising a piston and a cylinder having predetermined relative movement, a second lever coaxially pivoted with respect to the first named lever and operatively connected to actuate the second compressor, a pedal connected to the second lever, and a fluid motor in communication with the second compressor and operatively connected to the valve.

4. In mechanism of the class described, a brake, a liquid pressure system including a compressor and motor for applying the brake, fluid pressure power means for actuating the compressor and comprising a source of fluid pressure, a power cylinder connected to the compressor and a valve for controlling communication of fluid under pressure from said source to the power cylinder, a brake pedal, a second compressor connected to be actuated by the pedal, a second motor in communication with the second compressor and operatively connected to the valve, and a third motor operatively connected to the first named compressor and in communication with the second compressor.

5. In mechanism of the class described, a brake, a liquid pressure system including a compressor and motor for applying the brakes, a reservoir for the compressor, a member for actuating the compressor and having at least a part thereof positioned in the reservoir, power means for operating the member and comprising a fluid motor, a source of fluid pressure and a control valve for controlling communication of the fluid under pressure from said source to the fluid motor, a second compressor carried by the part of the member positioned in the reservoir and comprising a piston and a cylinder having predetermined relative movement, a brake pedal, connecting means between said pedal and second compressor for operating the latter by the pedal, and a fluid motor in communication with said second compressor and operatively connected to the valve.

6. In mechanism of the class described, a brake, a hydraulic pressure system for actuating the brake and comprising a fluid motor, a compressor connected to the motor, an independent source of fluid pressure, a power cylinder connected to the compressor to operate the hydraulic pressure system, a valve for controlling fluid under pressure from said independent source to the power cylinder, a second hydraulic pressure system for controlling the valve and comprising a fluid motor connected to actuate the valve and a compressor for creating hydraulic pressure to operate the fluid motor, a brake pedal pivotally mounted on a fixed support, said pedal and last named compressor being independently mounted, a mechanical connection between the pedal and the compressor of the second hydraulic system for actuating the latter, and means for actuating the compressor of the first named hydraulic system directly by said pedal after said pedal has applied a predetermined pressure to the second named hydraulic system by operating the compressor thereof, said last named means including the mechanical connection between the brake pedal and the compressor of the second named hydraulic system.

7. In mechanism of the class described, a brake, fluid pressure power means for actuating the brake and comprising a source of pressure and a control valve, a fluid motor for also actuating the brake, a second fluid motor operatively connected to the valve, a compressor, means for placing the compressor in communication with both fluid motors, and a pedal connected to the compressor to thereby operate it and create fluid pressure to simultaneously actuate the valve and apply actuating force to the brake by the two fluid motors, said fluid pressure power means when controlled by the valve to actuate the brake applying no pressure to the pedal controlled fluid system comprising the compressor and the two fluid motors.

BURNS DICK.